US009585166B2

United States Patent
Seok (10) Patent No.: US 9,585,166 B2
(45) Date of Patent: Feb. 28, 2017

(54) METHOD OF CONTROLLING CHANNEL ACCESS

(71) Applicant: LG ELECTRONICS INC., Seoul (KR)

(72) Inventor: Yong Ho Seok, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/713,601

(22) Filed: May 15, 2015

(65) Prior Publication Data

US 2015/0305064 A1  Oct. 22, 2015

Related U.S. Application Data

(63) Continuation of application No. 13/201,979, filed as application No. PCT/KR2009/004040 on Jul. 21, 2009, now Pat. No. 9,060,349.

(60) Provisional application No. 61/153,298, filed on Feb. 18, 2009.

(51) Int. Cl.
| *H04W 74/06* | (2009.01) |
| *H04W 74/00* | (2009.01) |
| *H04W 74/08* | (2009.01) |
| *H04W 84/12* | (2009.01) |

(52) U.S. Cl.
CPC ......... *H04W 74/006* (2013.01); *H04W 74/08* (2013.01); *H04W 84/12* (2013.01)

(58) Field of Classification Search
None
See application file for complete search history.

(56) References Cited

U.S. PATENT DOCUMENTS

| 5,559,804 A | 9/1996 | Amada et al. |
| 8,693,380 B2 | 4/2014 | He et al. |
| 2003/0053480 A1 | 3/2003 | Jang et al. |
| 2003/0134596 A1* | 7/2003 | Zhu ........................ H04W 88/08 455/41.1 |
| 2003/0214928 A1* | 11/2003 | Chuah ................. H04L 12/2602 370/336 |
| 2004/0052227 A1* | 3/2004 | Judd .................... H01Q 21/205 370/334 |

(Continued)

FOREIGN PATENT DOCUMENTS

| KR | 10-0442821 | 8/2004 |
| KR | 10-0442821 A | 8/2004 |

(Continued)

OTHER PUBLICATIONS

International Search Report for PCT/KR2009/004040 (PCT corresponding to the present application).

(Continued)

*Primary Examiner* — Andrew Lai
*Assistant Examiner* — Jamal Henson
(74) *Attorney, Agent, or Firm* — Morgan, Lewis & Bockius LLP (57) ABSTRACT

An embodiment of the present invention provides a method of controlling channel access in a WLAN system, comprising receiving, from an access point, a first channel access control message sent to stations located in some area through a directional antenna of the access point, and attempting to access a channel according to the first channel access control message. The method enables coexistence of several users and improves scalability of a wireless system.

4 Claims, 7 Drawing Sheets

(56) References Cited

U.S. PATENT DOCUMENTS

| | | | |
|---|---|---|---|
| 2004/0081133 A1 | 4/2004 | Smavatkul et al. | |
| 2004/0183726 A1* | 9/2004 | Theobold | H01Q 25/00 343/700 MS |
| 2004/0196834 A1* | 10/2004 | Ofek | H01Q 1/246 370/352 |
| 2004/0203804 A1* | 10/2004 | Merwe | H04W 16/00 455/446 |
| 2004/0253996 A1 | 12/2004 | Chen et al. | |
| 2005/0141468 A1 | 6/2005 | Kim et al. | |
| 2005/0157747 A1 | 7/2005 | Yang et al. | |
| 2005/0288069 A1* | 12/2005 | Arunan | H04W 52/0216 455/574 |
| 2006/0105771 A1* | 5/2006 | Iacono | H04W 16/28 455/446 |
| 2006/0164969 A1* | 7/2006 | Malik | H04B 7/0408 370/203 |
| 2007/0293218 A1 | 12/2007 | Meylan et al. | |
| 2008/0002632 A1* | 1/2008 | Pandey | H04W 48/12 370/338 |
| 2008/0146253 A1 | 6/2008 | Wentink | |
| 2009/0238132 A1* | 9/2009 | Nabetani | H04W 74/02 370/329 |
| 2009/0310618 A1 | 12/2009 | Carter | |
| 2009/0323611 A1 | 12/2009 | Singh et al. | |
| 2010/0061347 A1* | 3/2010 | Bracha | H04W 72/1226 370/336 |

FOREIGN PATENT DOCUMENTS

| | | |
|---|---|---|
| KR | 10-2005-0065123 A | 6/2005 |
| KR | 2005-0065123 | 6/2005 |
| KR | 2005-0067897 | 7/2005 |
| KR | 2005-0076153 | 7/2005 |

OTHER PUBLICATIONS

Office Action dated Oct. 7, 2014, issued by the Canadian Patent Office in Canadian Patent Application No. 2,771,881.

Office Action issued by the Canadian Intellectual Property Office on Oct. 31, 2013, in Canadian Patent Application No. 2,771,881.

* cited by examiner

| Order | Information |
|---|---|
| 1 | Category | ~410 |
| 2 | Action | ~420 |
| 3 | Channel Access Control Mode | ~430 |
| 4 | TIM (optional) | ~440 |
| 5 | AID (optional) | ~450 |
| 6 | MAC Address (optional) | ~460 |

| Order | Information |
|---|---|
| 1 | Category | ~610
| 2 | Action | ~620
| 3 | Channel Access Control Mode | ~630

FIG. 7

METHOD OF CONTROLLING CHANNEL ACCESS

CROSS REFERENCE TO RELATED APPLICATIONS

The present application is a continuation of U.S. patent application Ser. No. 13/201,979, filed on Aug. 31, 2011, the entire disclosure of which is hereby incorporated by reference for all purposes as if fully set forth herein. U.S. patent application Ser. No. 13/201,979 is a U.S. National Stage Entry of PCT International Application No. PCT/KR2009/004040, filed on Jul. 21, 2009, and claims the benefit of U.S. Provisional Application No. 61/153,298, filed on Feb. 18, 2009.

TECHNICAL FIELD

The present invention relates to a Wireless Local Access Network (WLAN), and more particularly to, a method of controlling channel access, when a WLAN system is applied in an environment where it can coexist with another wireless communication system.

BACKGROUND ART

There are frequency bands in which different kinds of wireless communication systems can coexist. One example of the frequency bands is a TV white space. The TV white space is an idle frequency band reserved due to digitalization of an analog broadcasting. The TV white space is a spectrum of 512 to 698 MHz allocated to a broadcast TV.

When a licensed device is not used in the corresponding spectrum, a unlicensed device can use the corresponding band. When the unlicensed device intends to use the TV white space, it should acquire an available channel in a corresponding area, using a geo-location database.

In addition, a signaling protocol such as a common beacon frame is necessary to solve a problem in coexistence of the unlicensed devices using the TV white space.

When IEEE 802.11 is used in the TV white space, there is an advantage in that the coverage is remarkably expanded due to the spectrum's characteristic.

However, generally, as the coverage is expanded, the number of stations considerably increases. In this situation, a problem may arise in a capability of flexibly handling users with increase of the number of the users, i.e. scalability. Moreover, since several wireless communication systems coexist and several unlicensed devices coexist, a problem may arise in coexistence. If a Distributed Coordination Function (DCF) and an Enhanced Distributed Channel Access (EDCA) protocol of IEEE 802.11 are applied in this environment, scalability may be more deteriorated.

The DCF is a channel access mechanism used in IEEE 802.11 and is based on Carrier Sense Multiple Access/Collision Avoidance (CSMA/CA). Also, the EDCA is equivalent to a competition-based medium access method among channel access models suggested by a Hybrid Coordination Function (HCF) defined by expanding a general medium access control protocol of IEEE 802.11. Here, the HCF is a protocol defined in IEEE 802.11e suggested to ensure Quality of Service (QoS).

Further, when the protocol of IEEE 802.11 is applied in the TV white space, it is expected that overlapping Basic Service Sets (BSSs) will increase sharply. For example, if a user arbitrarily installs an Access Point (AP) supporting the TV white space, since the coverage of the AP is wide, an overlapping service area may increase.

DISCLOSURE OF INVENTION

Technical Problem

An embodiment of the present invention is to improve scalability or coexistence in a competition-based channel access mechanism, and particularly, to reduce problems in scalability and coexistence, when a WLAN system is used in a frequency band where wireless communication systems coexist.

In addition, an embodiment of the present invention is to provide a channel access method which sets priorities differently according to a category of a data frame, so that it is possible to reduce a delay time of data sensitive to delay.

Therefore, the present invention is intended to provide stable QoS to a plurality of users.

Technical Solution

According to an aspect of the present invention, there is provided a method of controlling channel access in a WLAN system, comprising receiving, from an access point, a first channel access control message sent to stations located in some area through a directional antenna of the access point, and attempting to access a channel according to the first channel access control message.

Advantageous Effects

According to an embodiment of the present invention, scalability or coexistence can be improved in a competition-based channel access mechanism. Particularly, scalability and coexistence between users can be secured in an environment where different kinds of wireless communication systems are applied.

A delay time of data sensitive to delay can be reduced relatively. As a result, according to an embodiment of the present invention, an improved QoS can be provided to a plurality of users.

MODE FOR THE INVENTION

Figure 1:
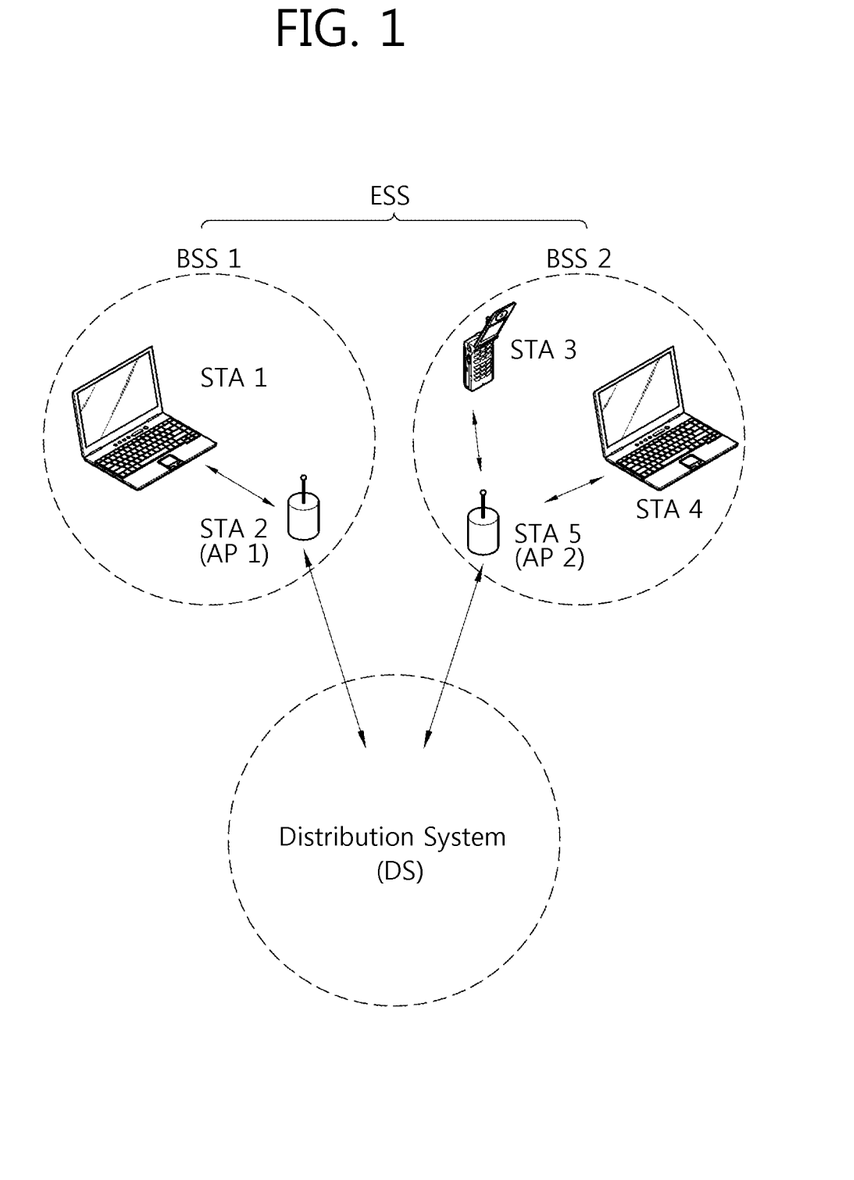
FIG. 1 is a schematic diagram illustrating configuration of one example of a Very High Throughput (VHT) WLAN system to which embodiments of the present invention can be applied.

FIG. 1 is a schematic diagram illustrating configuration of one example of a VHT WLAN system to which embodiments of the present invention can be applied.

Referring to FIG. 1, the WLAN system such as the VHT WLAN system includes one or more Basic Service Sets (BSSs). The BSS is a set of stations (STA) which can be successfully synchronized and communicate with one another, and is not a concept indicating a specific area. In addition, a BSS which supports ultrahigh speed data processing over 1 GHz in a Media Access Control (MAC) Service Access Point (SAP) as in the WLAN system to which the embodiments of the present invention can be applied is called a Very High Throughput (VHT) BSS.

The VHT BSS can be classified into an infrastructure BSS and an independent BSS (IBSS). The infrastructure BSS is shown in FIG. 1.

The infrastructure BSSs BSS1 and BSS2 include one or more non-AP STAs STA1, STA3 and STA4, access points (APs) STA2 and STA5 which are STAs providing a distribution service, and a distribution system (DS) connecting the plurality of APs STA2 and STA5. In the infrastructure BSS, the AP STA manages the non-AP STAs of the BSS.

On the contrary, the IBSS is a BSS operating in an Ad-Hoc mode. Since the IBSS does not include an AP VHT STA, there is no centralized management entity performing a management function in the center. That is, in the IBSS, non-AP STAs are managed in a distributed manner. In the IBSS, all STAs may be mobile stations configuring a self-contained network, since access to a DS is disallowed.

The STA is an optional functional medium including Medium Access Control (MAC) and a physical layer interface for a wireless medium in accordance with an IEEE 802.11 standard, and includes both APs and non-AP STAs in a wide meaning. Moreover, an STA which supports ultrahigh speed data processing over 1 GHz in a multi-channel environment described below is called a VHT STA. In the VHT WLAN system to which the embodiments of the present invention can be applied, the STAs included in the BSS may be VHT STAs, or VHT STAs and legacy STAs (e.g. HT STAs in accordance with IEEE 802.11n) which coexist with one another.

Among the STAs, a handheld terminal manipulated by a user is a non-AP STA STA1, STA3, STA4 and STA5. Simply, an STA may mean a non-AP STA. The non-AP STA may be called a terminal, a Wireless Transmit/Receive unit (WTRU), a User Equipment (UE), a Mobile Station (MS), a mobile terminal, a mobile subscriber unit, and so on. Moreover, a non-AP STA which supports ultrahigh speed data processing over 1 GHz in a multi-channel environment described below is called a non-AP VHT STA or a VHT STA simply.

Further, the APs AP1 and AP2 are functional entities which provide connection to the DS via a wireless medium for the STAs associated therewith. In principle, communication between the non-AP STAs is made via the AP in the infrastructure BSS including the AP. However, when a direct link is set up between the non-AP STAs, direct communication can be made between the non-AP STAs.

The AP may be called a convergence controller, a Base Station (BS), a node-B, a Base Transceiver System (BTS), a site controller, and so on. Also, an AP which supports ultrahigh speed data processing over 1 GHz in a multi-channel environment described below is called a VHT AP.

A plurality of infrastructure BSSs can be connected to each other through a Distribution System (DS). The plurality of BSSs connected through the DS are called an Extended Service Set (ESS). STAs included in the ESS can communicate with one another, and non-AP STAs can move from one BSS to another BSS in the same ESS while communicating without any interception.

The DS is a mechanism for allowing one AP to communicate with another AP. Here, the AP can transmit a frame to STAs associated with the BSS which the AP manages, transfer a frame when any STA moves to another BSS, or transfer a frame to an external network such as a wired network. The DS may not be a network necessarily. As long as the DS can provide a certain distribution service defined in IEEE 802.11, there is no limitation on a type of the DS. For example, the DS may be a wireless network such as a mesh network or a physical structure connecting the APs to each other.

Figure 2:
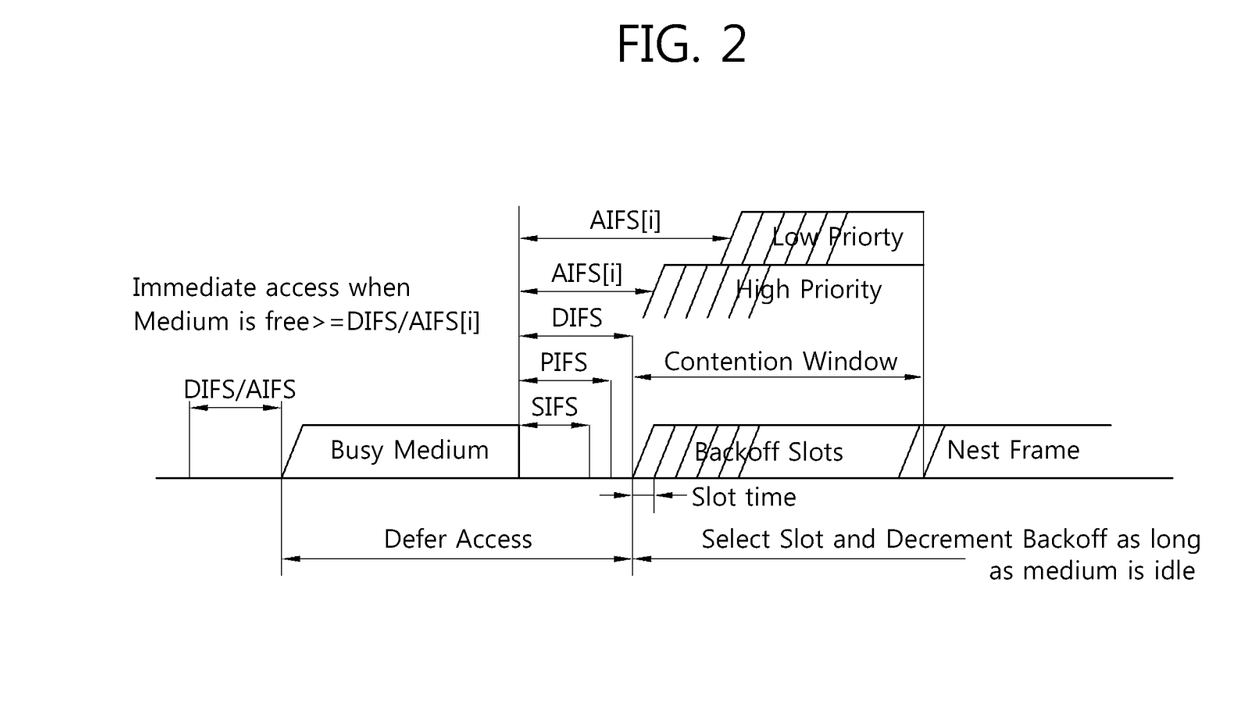
FIG. 2 is a diagram illustrating inter-frame spaces applied to a channel access mechanism in the WLAN system.

FIG. 2 is a diagram illustrating inter-frame spaces applied to a channel access mechanism in the WLAN system.

A channel access mechanism in accordance with IEEE 802.11 uses a Distributed Coordination Function (DCF) based on a Carrier Sense Multiple Access/Collision Avoidance (CSMA/CA).

The CSMA/CA protocol is intended to reduce a collision probability in a point where a plurality of STAs accessing one medium may probably collide with one another. For example, such collision probably occurs directly after the medium ends an idle state. It is because many STAs have waited until the medium is available. In this situation, a random backoff procedure is required to prevent medium contention conflict.

According to the CSMA/CA of the DCF, the STA performs the backoff procedure before starting transmission. This period is a contention window (CW) determined by the number of slot time. Therefore, the STAs select a backoff timer before accessing a channel. After the backoff timer is expired, the STAs can access the channel. The backoff timer is arbitrarily selected from the CW. An initial value of the CW is set as a parameter CWmin, and a maximum value thereof does not exceed CWmax.

The backoff procedure reduces a collision probability when several STAs attempt to access the channel. After a certain time elapses, when the STA senses an idle state of the channel or medium again, the STA counts down, decrementing a backoff timer value at the time of pausing the backoff procedure.

The CW can be represented as a positive integer having a value between CWmin and CWmax. Methods for setting a new CW value are divided by whether frame transmission is successful or not.

When the STA does not receive acknowledgement regarding data frame transmission after accessing the channel, it judges that collision has occurred, doubles the CW, and performs the backoff procedure again.

In this manner, as the time elapses, the STA has a value smaller than a random backoff time of another STA, acquires a high priority, and finally uses the channel.

On the contrary, when the STA receives acknowledgement regarding data frame transmission after accessing the channel, it resets the CW to be CWmin which is a minimum value, and performs another backoff procedure for next frame transmission.

Inter-frame spaces defined in the DCF include a Short Inter-Frame Space (SIFS), a PCF Inter-Frame Space (PIFS) and a Distributed Inter-Frame Space (DIFS). The inter-frame space means a minimum idle time set between transmitted frames. The STA judges that the medium is in an idle state during this time interval.

The SIFS indicates a response time spent until a response frame is transmitted. That is, after a data frame is transmitted, its response frame (or ack frame) is transmitted after the SIFS time.

The PIFS indicates an idle time to transmit a CF-Poll frame so that the AP can generate a contention free period. That is, after the PIFS time elapses, if the channel is in an idle mode, the AP can transmit the CF-Poll frame.

The DIFS indicates an idle time to transmit a frame in a contention period. After the DIFS time elapses, if the channel is in an idle mode, the STA can perform a backoff procedure to transmit a frame.

Meanwhile, IEEE 802.11e uses an Enhanced Distributed Channel Access (EDCA) technique to improve Quality of Service (QoS). According to the EDCA technique, a concept of an Access Category (AC) is defined to provide differentiated services based on priorities. Each AC uses a predetermined contention parameter and an Arbitration Inter-Frame Space (AIFS[AC]) replacing the DIFS, and has differentiated CWmin[AC] and CWmax[AC].

Provided are four ACs, Access Category Voice (AC_VO), Access Category Video (AC_VI), Access Category Best Effort (AC_BE) and Access Category Background (AC_BK).

The STA has four transmission queues which are recognized as a QoS parameter and a virtual STA for determining priorities. A separate queue exists for every AC. As explained above, CWmin and CWmax have different values for every AC. In addition, the AIFS has a different value for every AC.

If backoff counter values of a plurality of ACs located in parallel in one STA reach '0' at the same time, a scheduler provided in the STA prevents virtual collision.

In the respective frames, the AIFS[AC] is set to have different sizes according to priorities defined in the ACs. A frame of a top priority has an Inter-Frame Space (IFS) approximate to the DIFS, and a frame of a lower priority has a longer IFS. As a result, a frame having a high priority more possibly accesses the medium.

The CW also has different CWmin[AC] and CWmax[AC] according to the priorities. A frame of a higher priority has smaller CWmin[AC] and CWmax[AC]. Therefore, even if collision occurs, the frame of the high priority can reduce a waiting time for accessing the medium. It is of advantage when data of the transmission queue acquire a transmission opportunity.

Briefly, the higher the priority is, the smaller CWmin, CWmax and AFIS are set. It is thus possible to provide differentiated services according to the priorities for every AC.

Figure 3:
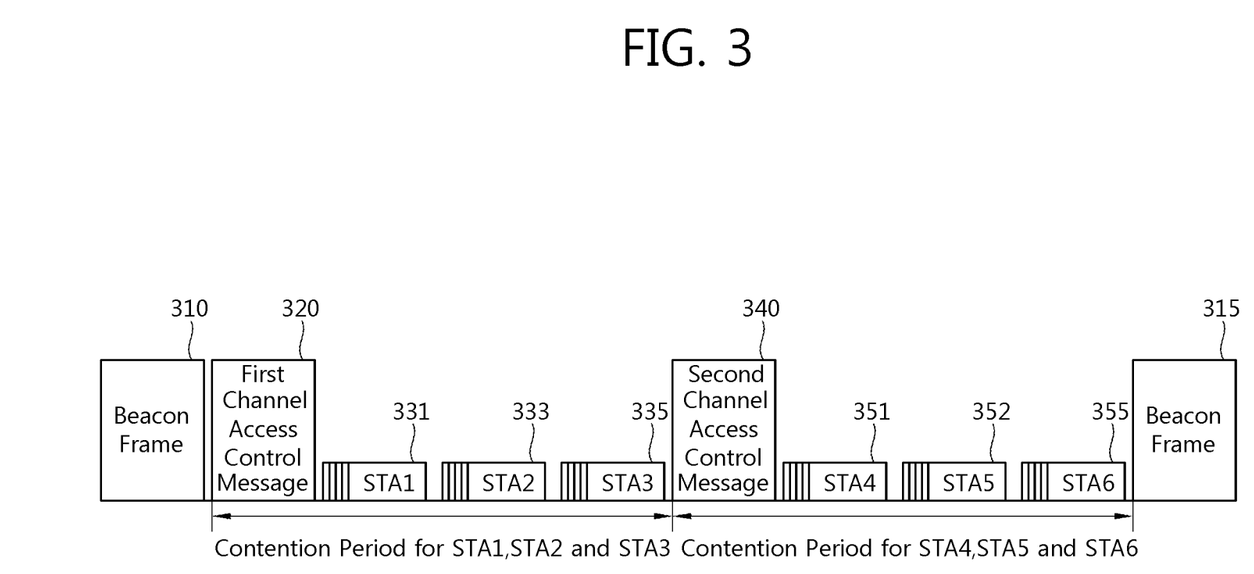
FIG. 3 is a diagram illustrating a channel access method according to one embodiment of the present invention.

FIG. 3 is a diagram illustrating a channel access method according to one embodiment of the present invention.

As set forth herein, the channel access method explained with reference to FIG. 3 can be used in an idle band such as a TV white space.

When a competition-based channel access mechanism is used, a problem commonly arises in scalability. Particularly, a problem may arise in coexistence as well as scalability in the idle band. In order to solve the foregoing problems, there is a method using Request To Send (RTS)/Clear To Send (CTS), or a method of adjusting the number of competing STAs by an AP. A method for solving or reducing such problems via channel access control will be suggested in the embodiment of the present invention.

Referring to FIG. 3, a transverse axis indicates time flow. Here, the access of STAs is not sequential necessarily as shown in FIG. 3, and the sequence of the STAs accessing a channel is not limited to the sequence of FIG. 3. The sequence of the STAs shown in FIG. 3 is intended for convenience of explanation, which is not relevant to the embodiment or right scope of the present invention.

FIG. 3 illustrates a channel access mechanism where a beacon interval between a beacon frame 310 and a beacon frame 315 includes one or more contention periods (CPs).

The entire time is divided into a Contention-Free Period (CFP) and a Contention Period (CP). Wireless devices operate for the CP in the DCF and for the CFP in the PCF.

Here, an Access Point (AP) transmits a channel access control message to the STAs, to thereby control channel access of the STAs. For convenience's sake, an early transmitted channel access control message is referred to as a first channel access control message 320. The AP transmits the first channel access control message 320 containing information on the STA to be allowed to access the channel, thereby designating the STA to be allowed to access the channel among the associated STAs.

The contents of the first channel access control message 320 will be described later in more detail with reference to FIG. 4.

In this chase, the AP broadcasts the first channel access control message 320. There is no limitation on the STAs which can receive the first channel access control message 320. That is, the AP transmits the first channel access control message 320 in an omni-directional mode so that all the STAs can hear it.

The STAs receiving the first channel access control message 320 from the AP confirm whether they are allowed to access the channel, respectively. For example, if the first channel access control message 320 contains MAC address information equivalent to an MAC address of a corresponding STA, the STA can access the channel for a predetermined time.

Alternatively, a TIM element may be used to judge whether channel access is allowed, which will be described later with reference to FIG. 4.

When the AP intends to change the STAs allowed to access the channel, it retransmits a channel access control message. For convenience's sake, a second transmitted channel access control message is referred to as a second channel access control message 340. The second channel access control message 340 is also broadcasted to all the STAs. The AP can add information designating STAs other than the STAs allowed to access the channel via the first channel access control message 320 to the second channel access control message 340.

The STAs which were allowed to access the channel via the first channel access control message 320, and receive the second channel access control message 340, but are disallowed to access the channel via the second channel access control message 340 pausing accessing the channel.

A channel access control management frame may be transmitted directly after the PIFS time so as to improve a priory.

As described above, the AP can adjust the number of the competing terminals in the DCF and EDCA through the channel access control message 320 or 340. Consequently, the effect is same as when a beacon interval is divided into several contention periods. The list and number of the competing terminals may be changed in each contention period.

Figure 4:
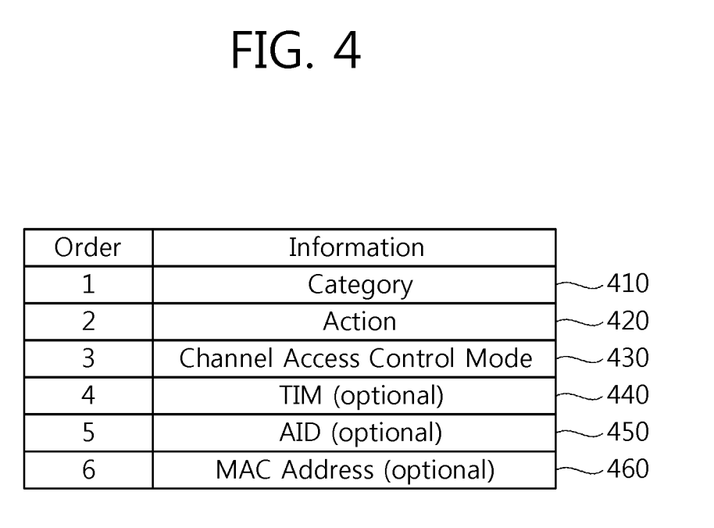
FIG. 4 is a diagram illustrating a channel access control message transmitted by the channel access method explained with reference to FIG. 3.

FIG. 4 is a diagram illustrating the channel access control message transmitted by the channel access method explained with reference to FIG. 3.

The control message may follow a format of a channel access control management frame. The channel access control management frame may contain information on a MAC address, an Associated ID (AID) and a Traffic Indication Map (TIM) of terminals allowed to access the channel.

That is, according to the foregoing embodiment, the AP broadcasts the channel access control management frame.

A category field 410 indicates a frame category, i.e. a corresponding frame is a management frame for controlling channel access. In addition, an action field 420 indicates that the corresponding frame is intended for an operation of allowing or disallowing channel access of the STA.

A channel access control mode field 430 has one octet. For example, with respect to allowing or disallowing channel access, if a field value of the channel access control mode field 430 is '1', it means 'allow', and if the field value is '0', it means 'disallow'.

A conventional TIM element can be used to indicate whether the AP has data to be sent to the STAs operating in a power saving mode. In this case, the TIM element may be contained in a beacon frame. However, according to the embodiment of the present invention, a TIM field 440 is contained in the channel access control management frame, and used to indicate whether the STAs receiving the channel access control management frame are allowed to access the channel through the DCF and the EDCA.

Accordingly, the STAs receiving the channel access control management frame confirm the TIM field 440 first, and then confirm whether a bit of an AID field 450 has been set as '1' for the corresponding STAs. If the bit of the AID field 450 is set as '1', the STA starts contention-based channel access through the DCF or EDCA.

If not, e.g. if the TIM field 440 does not exist in the frame or the bit of the AID field 450 is set as '0', the corresponding STAs pause accessing the channel.

The channel access control management frame may contain an Associated ID (AID) 450 and a MAC address 460 of the terminal allowed to access the channel, instead of the TIM field 440.

That is, the STA judges whether it is allowed to access the channel by checking the AID field 450 or the MAC address field 460. For example, when the same AID or MAC address information is contained in the channel access control management frame, or when a field value of a corresponding field of the received channel access control management frame is set as an appointed value, the corresponding STA can access the channel.

In the opposite case, the STA does not access the channel or pauses accessing the channel.

The TIM field 440, the AID field 450 or the MAC address field 460 may be optionally contained in the channel access control management frame. If such fields are contained in the channel access control management frame, one or more of the TIM field 440, the AID field 450 and the MAC address field 460 may be selectively contained therein.

When the TIM field 440, the AID field 450 and the MAC address field 460 are contained in the channel access control management frame, the channel access control mode field 430 can be used as information indicating whether channel access is allowed, and the TIM field 440, the AID field 450 or the MAC address field 460 can be used as information specifying the STA allowed to access the channel.

For example, if the channel access control mode field 430 is '1', the STAs specified via the TIM field 440, the AID field 450 or the MAC address field 460 are allowed to access the channel. On the contrary, if the channel access control mode field 430 is '0', the terminals specified via the TIM field 440, the AID field 450 or the MAC address field 460 are not allowed to access the channel.

Meanwhile, a case where the TIM field 440, the AID field 450 and the MAC address field 460 are not contained in the channel access control management frame will be explained later with reference to FIG. 6.

Figure 5:
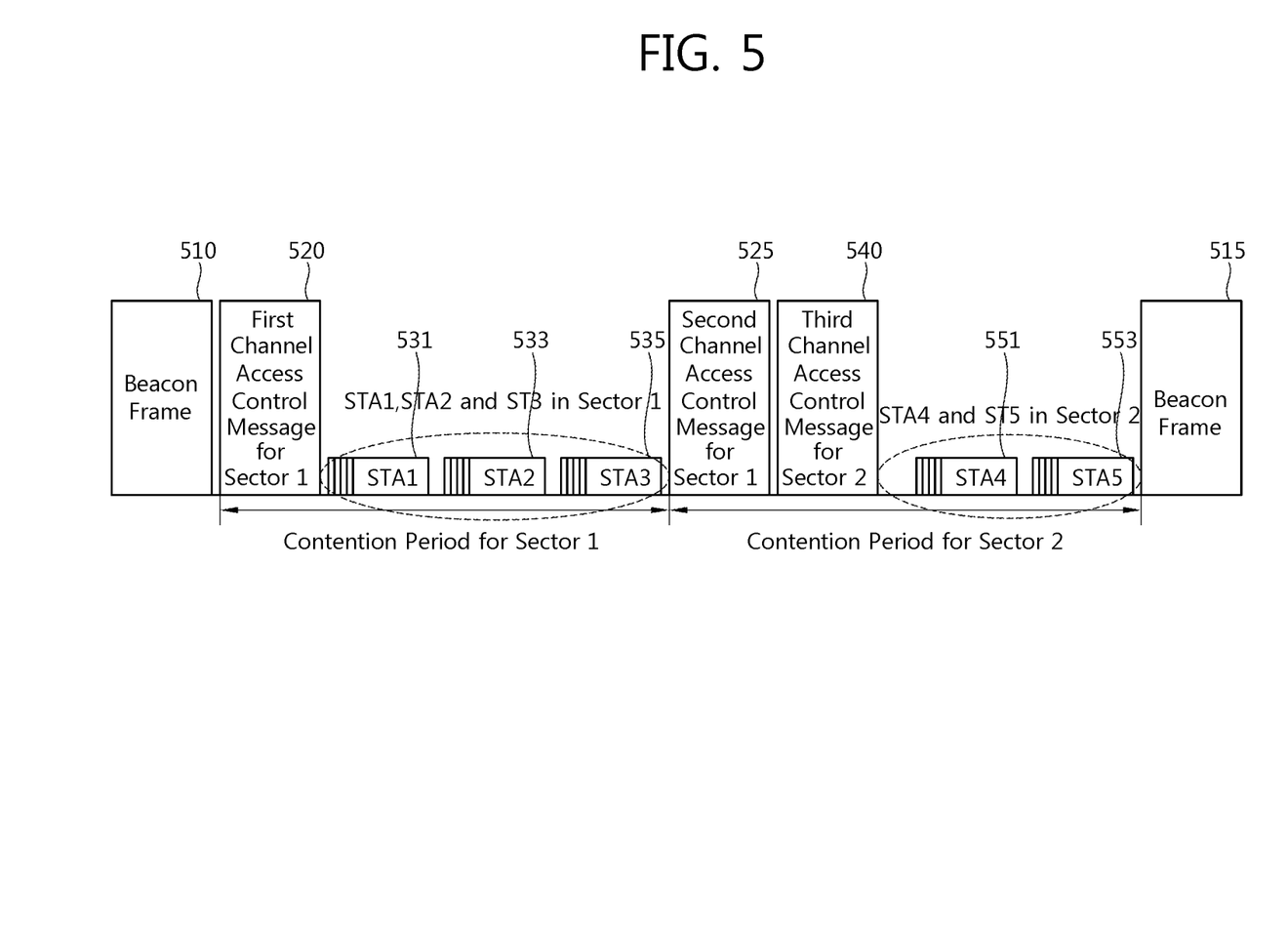
FIG. 5 is a diagram illustrating a channel access method according to another embodiment of the present invention.

FIG. 5 is a diagram illustrating a channel access method according to another embodiment of the present invention.

According to another embodiment of the present invention, an AP can designate terminals to be allowed to access a channel among associated terminals by dividing them in a spatial manner.

When a service area of the AP is divided into several sectors, a sector in which STA1 531, STA2 533 and STA3 535 are located is referred to as sector 1, and a sector in which STA4 551 and STA5 553 are located is referred to as sector 2.

The AP transmits a first channel access control message 520 and a second channel access control message 525 to sector 1, and transmits a third channel access control message 540 to sector 2. A method of transmitting a channel access control message to a specific sector can be used when the AP supports a directional antenna. That is, the AP supporting the directional antenna can transmit the channel access control message toward STAs in a specific sector.

In this situation, since the STAs are automatically specified by a transmission direction, the channel access control message notifies all the STAs that channel access is allowed or disallowed.

First of all, when the AP intends to allow the STAs in sector 1 to access the channel, the AP transmits the first channel access control message 520 to sector 1, i.e. STA1 531, STA2 533 and STA3 535.

In addition, when the AP intends to end a contention period and change an area allowed to access the channel, the AP transmits the second channel access control message 525 to sector 1. Here, as mentioned above, sector 1 is a sector currently allowed to access the channel.

If the first channel access control message 520 is a message for allowing channel access, the second channel access control message 525 is a message for disallowing or pausing channel access. The AP transmits the second channel access control message 525 to sector 1, to thereby notify that all the STAs in sector 1 are not allowed to access the channel.

Next, the AP transmits the third channel access control message 540 to sector 2 which is a sector to be changed, i.e., a sector to be newly allowed to access the channel. The third channel access control message 540 contains the contents that all the STAs in the corresponding sector are allowed to access the channel, like the first channel access control message 520. However, while the first channel access control message 520 is intended to allow the STAs in sector 1 to access the channel, the third channel access control message 540 is intended to allow the STAs in sector 2 to access the channel. STA4 551 and STA5 553 are allowed to access the channel via the third channel access control message 540.

As the AP transmits the third channel access control message 540, a contention period for sector 2 starts. The STAs in sector 2 receiving the third channel access control message 540 access the channel. This channel access procedure for every sector may be called a 'sectored channel access mechanism.

Figure 6:
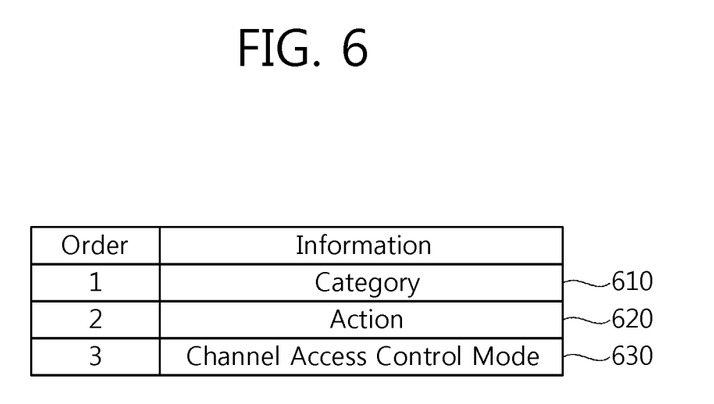
FIG. 6 is a diagram illustrating a channel access control message transmitted by the channel access method explained with reference to FIG. 5.

FIG. 6 is a diagram illustrating the channel access control message transmitted by the channel access method explained with reference to FIG. 5.

Basic functions of a channel access control management frame shown in FIG. 6 are identical to those of the channel access control management frame shown in FIG. 4. However, in the embodiment explained with reference to FIG. 5, the AP transmits the frame limitatively to the STAs to be allowed or disallowed to access the channel.

Accordingly, the channel access control management frame can contain only a category field 610, an action field 620 and a channel access control mode field 630. As described above, the category field 610 indicates a frame category, i.e. a corresponding frame is a management frame for controlling channel access, and the action field 620 indicates that the corresponding frame is intended for an operation of allowing or disallowing channel access of the STA.

For example, the AP can transmit the frame merely to STAs located in a certain sector, using a directional antenna or the like. Therefore, in this case, information for specifying STAs needs not to be contained in the channel access control management frame. Accordingly, the channel access control management frame according to this embodiment may not contain fields such as TIM, AID and MAC address.

When the TIM, AID and MAC address fields are not contained in the channel access control management frame as in the embodiment shown in FIG. 6, whether all the STAs receiving the channel access control management frame are allowed to access the channel is determined by a value of the channel access control mode field 630. For example, when the value of the channel access control mode field 630 is '1', all the terminals are allowed to access the channel. On the contrary, when the value of the channel access control mode field 630 is '0', all the terminals are not allowed to access the channel.

Moreover, the channel access control management frame may be transmitted to end channel access. The channel access control management frame is different from the channel access control management frame shown in FIG. 4 in that the action field 620 has two different values according to whether the frame is intended to allow channel access or end already-started channel access.

For example, when the field value of the action field 620 is '1', STAs in a certain sector are allowed to access the channel. Thereafter, when the channel access control management frame where the field value of the action field 620 is set as '0' is transmitted to the STAs in the sector, the STAs in the sector cannot attempt to access the channel any more.

Alternatively, the channel access control mode field 630 may have different values to indicate whether the frame is intended to allow channel access or end already-started channel access. For example, when the value of the channel access control mode field 630 is set as '1', all the STAs receiving the corresponding channel access control management frame can access the channel, and when the value of the channel access control mode field 630 is set as '0', all the STAs receiving the corresponding channel access control management frame pause accessing the channel.

Here, the contents or values of each field are provided for an exemplary purpose, and thus may be set differently for every embodiment.

Figure 7:
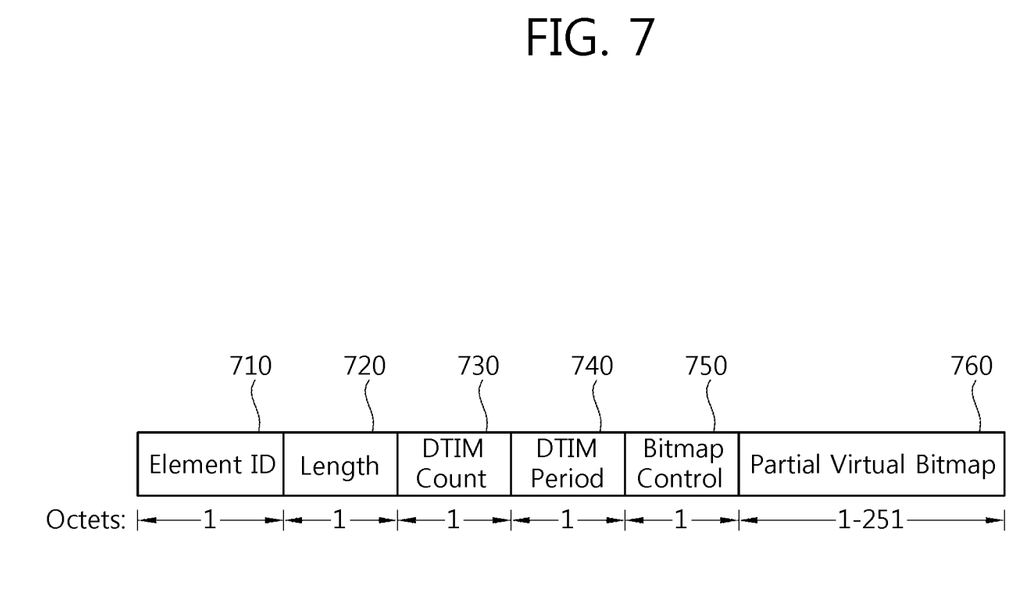
FIG. 7 is a diagram illustrating a Traffic Indication Map (TIM) of the channel access control message explained with reference to FIG. 4 or 6.

FIG. 7 is a diagram illustrating a Traffic Indication Map (TIM) of the channel access control message explained with reference to FIG. 4 or 6. The TIM element will be explained in detail with reference to FIG. 7.

As explained above, the TIM element contained in the TIM field indicates whether an AP has data to be sent to STAs operating in a power saving mode.

The TIM may contain an element ID field 710, a length field 720, a Delivery Traffic Indication Message (DTIM) count field 730, a DTIM period field 740, a bitmap control field 750, a partial virtual bitmap field 760, and so on.

The DTIM count field 730 indicates how many beacon frames appear, including the current frame, before a next DTIM. When a DTIM count value is '0', it means that the current TIM is a DTIM. Here, the DTIM count field is one octet.

The DTIM period field 740 indicates how many beacon frames exist between beacon interval continuing DTIMs. If all the TIMs are DTIMs, a value of the DTIM period field 740 is '1'. The DTIM period field 740 is one octet.

The bitmap control field 750 is also one octet. Bit 0 of the bitmap control field 750 contains a traffic indicator bit associated with Association ID (AID) 0.

The partial virtual bitmap field 760 of the TIM indicates whether frames heading for associated STAs have been buffered.

For example, when the AP is buffering a frame for an STA having AID1, a first bit of the partial virtual bitmap field 760 is expressed as '1'.

The DTIM is a special TIM element. A format of a DTIM element is identical to a format of a TIM element. However, the DTIM informs that a multicast frame and a broadcast frame have been buffered in the AP.

If the AP buffers the multicast frame and the broadcast frame, a 0-th bit of the partial virtual bitmap field 760 can be expressed as '1'. Here, '0' which is one of the values of the AID field is a reserved value for a multicast or broadcast session.

All the methods described herein can be performed by processors such as micro-processors, controllers, microcontrollers, and Application Specific Integrated Circuits (ASICs) using softwares or program codes coded to perform the same, or a processor of the terminal shown in FIG. 3. Design, development and realization of such codes are obvious to those of ordinary skill in the art by the description of the present invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of controlling a channel access in a wireless local area network system, the method comprising:
  receiving, by an accessing station, a channel access message from an access point, the channel access message including a category field and a channel access control mode, the category field indicating that a format of the channel access message is structured for a sectored channel access to allow a channel access of one or more groups of stations based on a plurality of geographical sectors that are partitions of a coverage area of the access point; and
  transmitting, by the accessing station, data based on the channel access control mode,
  wherein the channel access control mode has a single bit, the channel access control mode being set to zero to indicate that the accessing station is allowed to transmit data in an allowed sector among the plurality of geographical sectors, the channel access control mode being set to one to indicate that the accessing station is allowed to transmit data in all of the plurality of geographical sectors.

2. The method of claim 1, wherein the channel access message is transmitted by the access point through a directional beam that covers the allowed sector.

3. A device for a wireless local area network, the device comprising:
- a processor; and
- a memory operatively coupled with the processor and storing instructions that when executed by the processor causes to the device to:
  - receive a channel access message from an access point, the channel access message including a category field and a channel access control mode, the category field indicating that a format of the channel access message is structured for a sectored channel access to allow a channel access of one or more groups of stations based on a plurality of geographical sectors that are partitions of a coverage area of the access point; and
  - transmit data based on the channel access control mode,
  - wherein the channel access control mode has a single bit, the channel access control mode being set to zero to indicate that the accessing station is allowed to transmit data in an allowed sector among the plurality of geographical sectors, the channel access control mode being set to one to indicate that the accessing station is allowed to transmit data in all of the plurality of geographical sectors.

4. The device of claim 3, wherein the channel access message is transmitted by the access point through a directional beam that covers the allowed sector.

* * * * *